United States Patent [19]
Hinds

[11] Patent Number: 5,648,690
[45] Date of Patent: Jul. 15, 1997

[54] MOTOR SYSTEM GENERATING ORTHOGONAL MOVEMENT IN A SINGLE PLANE

[76] Inventor: Walter E. Hinds, 1358 Schuyler Rd., Beverly Hills, Calif. 90210

[21] Appl. No.: 404,349

[22] Filed: Mar. 15, 1995

[51] Int. Cl.⁶ .................................................. F16M 11/12
[52] U.S. Cl. ........................ 310/12; 74/480 R; 248/178.1
[58] Field of Search .................. 310/12, 112; 318/135; 74/479.01, 480 R; 108/143, 137; 248/178.1

[56] References Cited

U.S. PATENT DOCUMENTS

| | | | |
|---|---|---|---|
| 3,376,578 | 4/1968 | Sawyer | 346/29 |
| 3,857,078 | 12/1974 | Sawyer | 318/608 |
| 4,560,911 | 12/1985 | Chitayat | 318/135 |
| 4,654,571 | 3/1987 | Hinds | 318/687 |
| 4,761,573 | 8/1988 | Chitayat | 310/12 |
| 4,808,892 | 2/1989 | Dreibelbis | 318/135 |
| 4,985,651 | 1/1991 | Chitayat | 310/12 |
| 5,216,932 | 6/1993 | Takei | 74/49 R |
| 5,341,700 | 8/1994 | Speranza et al. | 74/89.14 X |
| 5,405,222 | 4/1995 | Ward | 409/201 |
| 5,523,941 | 6/1996 | Burton et al. | 364/167.01 |

*Primary Examiner*—Steven L. Stephan
*Assistant Examiner*—Judson H. Jones
*Attorney, Agent, or Firm*—Merchant, Gould, Smith, Edell, Welter & Schmidt

[57] ABSTRACT

A linear motor system for providing XY motion comprises a first linear motor directed for effecting movement of a first element in a first of two orthogonal directions. There is a second linear motor directed for effecting movement of a second element in a second of the orthogonal directions. The motors are mounted on a base such that the elements are located and movable in a single plane in the respective orthogonal directions relative to each other over the base. A shuttle is reactive with the two elements such that movement of the elements effects XY movement of the shuttle. The elements and the shuttle are mounted on air bearings and interaction of the shuttle with the elements is also through an air bearings to control angular movement of the shuttle. This system provides for very fine movement in an XY direction which can be precisely controlled while angular movement of the shuttle is prevented.

53 Claims, 5 Drawing Sheets

MOTOR SYSTEM GENERATING ORTHOGONAL MOVEMENT IN A SINGLE PLANE

BACKGROUND

Providing a motor system operational in a single plane and capable of fine controllable movement in the XY plane is highly desirable.

This invention relates to motors for effecting movement in an XY plane. In particular, the invention is directed to a system of linear motors operating such that control of movement of a shuttle in the plane can be finely regulated, and wherein the angular movement can be restrained.

Modern technology requires a system where a shuttle can move in a XY plane, and wherein the profile of the motor system and shuttle is maintained relatively low. As such, a workpiece can be located on the shuttle which is located on a table so that it is mounted strategically relative to different tools or other elements. Work can then be conducted on workpieces or components on the table as required.

As components have grown smaller in size, it is necessary to be able to locate tools and the like more precisely relative to the workpiece along XY coordinates. Operations need to be effected on the component within an accuracy of one tenth of a thousandth of an inch of accuracy, or even closer tolerances.

It is known to locate two linear motors orthogonally relative to each other in a piggy-back relationship. U.S. Pat. No. 4,808,892 (Dreibelbis). These motors operate in two different planes, namely a compound or multi-planar relationship. The difficulty with this configuration is the height of the structure. Such multi-plane systems operate with DC motors such that accurate movement in each orthogonal direction can be controlled. The multi-planar configuration, namely the height of the system, however, is a disadvantage in the overall construction of apparatus operating in an XY plane.

It is known to have linear stepper motors operate in a single plane such that a platen, shuttle or the motor itself can move in the XY plane. U.S. Pat. Nos. 3,376,578 and 3,857,078 (Sawyer). As part of this system, linear stepper motors are incorporated in the shuttle which moves over a waffle surface. A disadvantage of such a system is that the waffle surface which is used for interaction with the motor has discrete magnetic elements in the form of pinhead elements arranged on the base about which the platen, shuttle or motor unit moves. The pinhead elements cannot be reduced beyond a predetermined size. The motor movement across the base is thus effected in steps greater than several thousandths of an inch. Such accuracy is not adequate in many applications requiring finer motion control with modern technology applications. As a consequence, such stepper motor operation has its limitations in fine movement control.

The typical pitch of the surface as defined by the pinhead is about 0.04 inch. Each pulse of power causes a stepper linear motor which is part of the shuttle system to move in a microstep manner such that the motion of each step is in the order of 0.01 inch for a two-phase motor or 0.005 inch for a four-phase motor. This is insufficiently fine control for modern technology needs.

This relative inaccuracy is further aggravated in that where there is an open loop system with such linear stepper motors there is the possibility that the motor will go out of synchronization and lose position.

Another manner of regulating movement in a single plane is effected by a DC motor movable over a checkerboard plane of different magnetic fields. Such a system is disclosed in U.S. Pat. No. 4,654,571, by the present applicant (Hinds). Such a system requires complex laser beam and laser interferometer detection means for regulating movement of the shuttle over the plane.

Linear DC motors having feedback means are wellknown. U.S. Pat. Nos. 4,560,911 and 4,761,573 (Chitayat) describe such motors. The feedback means can facilitate very accurate control of movement of a table, platen or the like in a single direction.

It is unknown to provide a system of linear motors whereby a platen, table or shuttle can be moved in more than one direction, namely an XY direction, which is a compound orthogonal direction with the same degree of accuracy as movement of the shuttle in a single direction.

There is a need for having a motor system providing for accurate XY movement, which has a relatively low profile, and which has the ability to be restrained in angular movement.

SUMMARY

By this invention there is provided a motor system minimizing the drawbacks of known motor systems having mobility in an XY direction.

There are means for coupling two single-axis linear motors arranged in a single plane to a shuttle so that movement can be effected of the shuttle in a single plane in two dimensions. This permits a low profile configuration. Means is provided for movement of a shuttle, platen, stage or table in an XY direction with fine movement which is controllable to substantially the same extent as movement is controllable in a single direction with a linear motor operating with feedback.

The XY motion is a combination of X and Y motion, and the first orthogonal direction can be the X direction, and the second orthogonal direction can be the Y direction.

According to the invention, there is provided a motor system for XY motion, namely compound orthogonal motion in a single plane. Angular movement of the shuttle is essentially restrained.

There is a first linear motor for effecting movement of a first movable element in a first of two orthogonal directions. A second linear motor is provided for movement of a second movable element of the second motor in a second of the orthogonal directions.

A base is provided for locating the first motor and the second motor relative to each other in a single plane so that the respective elements are movable in their respective orthogonal directions relative to each other over the base and in the single plane.

A shuttle is reactive with two elements such that movement of the elements effects XY movement of the shuttle.

At least one of the elements, or the shuttle, includes an air bearing relative to the base. In a preferred form of the invention, each of the elements includes an air bearing relative to the base and the shuttle additionally includes an air bearing relative to the base. Each of the elements operates with respect to feedback means for each linear motor so that as each element moves in its respective direction the motion of the element is precisely controlled by a positive feedback loop.

The elements interact with the shuttle so that as each element moves in its respective X or Y direction, the shuttle can be moved across the base in an XY direction as appropriate. The shuttle preferably interacts with each of the elements through an air bearing between the interface of the respective elements and the air bearing.

The feedback means for each of the respective motors is a linear encoder and can be selectively a magnetic feedback means or optical feedback means. The feedback means includes an encoder which includes a read head and an elongated scale which runs parallel with the motor. As the element moves longitudinally in the linear direction, the read head means operates with the scale such that the precise location of the element relative to the scale can be controlled.

The encoder, when operable magnetically, includes fine, discrete magnetic elements forming a scale operable with the read head. There is a read head operable with interference elements on the scale which are also discrete elements.

In this manner, the motion in each of the linear directions can be controlled to less than one tenth thousands of an inch in each respective direction. Thus, the combination of the control of the linear motion controlled in each respective direction ensures that the motion of the shuttle in the XY direction is likewise controlled to essentially the same degree of accuracy as each respective motion of the linear motors with feedback.

In a preferred form of the invention, the shuttle interacts with each of the elements through air bearings. Preferably, there are a pair of air bearings between each of the elements and the shuttle, the respective air bearings of the pair being spaced so that angular movement of the shuttle relative to the direction of the linear movement of each element can be controlled.

The air bearings are formed by the interaction of a preload developed by magnetic attraction caused by magnetic means between the shuttle and the elements, and a repulsion force generated by air pressure. The pressure is generated by generating means in each motor for creating the repulsion force between the elements and the shuttle.

In another preferred form of the invention, the scales of the feedback encoders are located on the shuttle. The respective elements or read heads of each of the motors operates with an scale on the shuttle. The scales on the shuttle, for cooperation with a read head from each motor, are respectively strategically located relative to the appropriate read head from the respective motor. The relationship is such that a read head from a first motor operates with a scale on the shuttle to control the element of the second motor. Similarly, a scale on the shuttle works with the read head from the second motor and the element of the first motor.

The invention is further described with reference to the accompanying drawings.

DRAWINGS

DESCRIPTION

Figure 1:
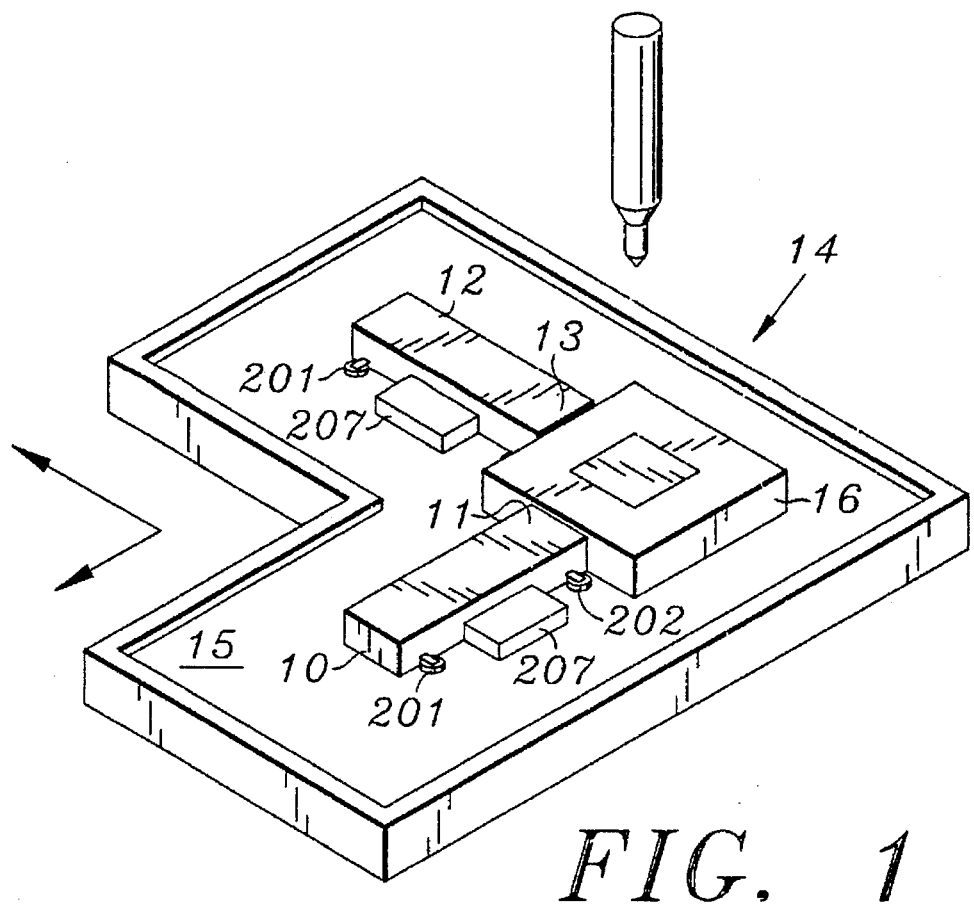
FIG. 1 is a perspective representation of a base with two orthogonally located linear motors on the base.

A linear motor system for providing XY motion, namely compound orthogonal motion comprises a first linear motor 10 directed for effecting movement of an element 11 in a first of two orthogonal directions, namely the X direction. A second motor 12 includes an element 13 directed in a second orthogonal direction, namely the Y direction. The motors 10 and 12 are mounted on a base element 14 so that the respective motors 10 and 12 operate in a single plane. The elements 11 and 13 thus move in their respective orthogonal directions X and Y respectively in a single plane over the surface or platform 15. The base element 14 includes a flat surface 15 which is preferably made of iron or some other magnetic material.

A shuttle 16 is capable of movement over the surface 15 under the interaction of the elements 11 and 13. The movement is in the XY plane, namely a compound orthogonal direction as required. Angular movement is avoided.

At least one of the elements 11 or 13 or the shuttle element 16 has an air bearing relative to the surface 15. In the arrangement illustrated, both the elements 11 and 13 and the shuttle 16 have air bearings relative to the surface 15.

Figure 3:
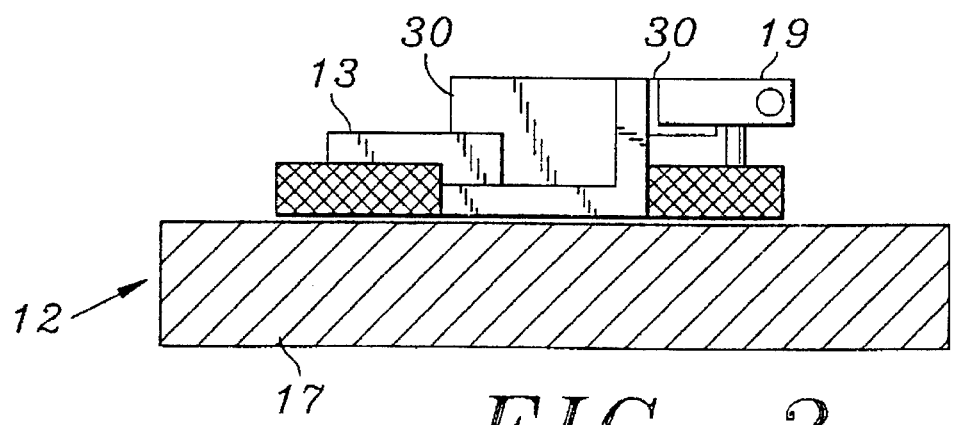
FIG. 3 is an end view of a linear motor.
Figure 2A:
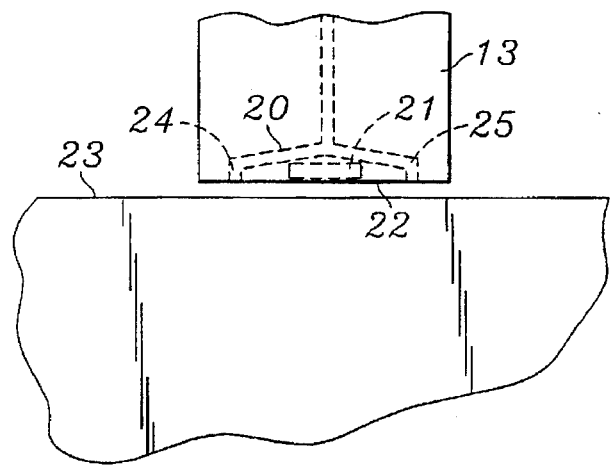
FIGS. 2 and 2a are a plan view illustrating two linear motors in relationship with a platen.
Figure 2:
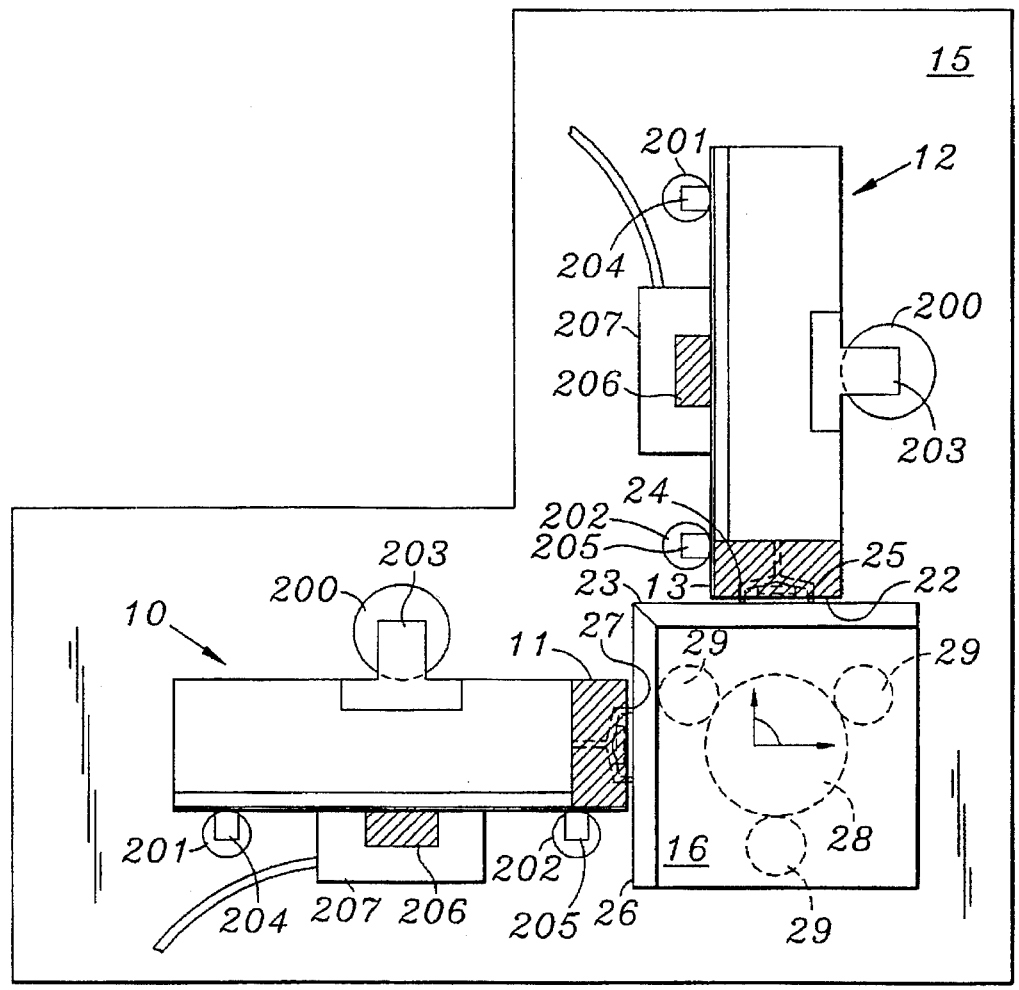
Figure 4:
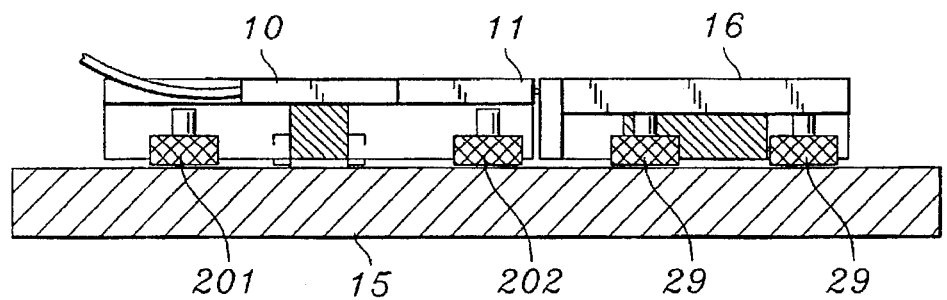
FIG. 4 is a side view of a linear motor in relationship to a shuttle mounted on a base.

Each of the motors 10 and 12 is a linear motor including a feedback means to facilitate accurate movement of the elements 11 and 13, respectively. The motor 12 which is illustrated in FIG. 3 includes a motor primary or armature 17 which is built into part of the steel base plate constituting the surface 15. The element 13 which is movable is illustrated in FIG. 3 in the form of an element 18 which runs over an elongated armature which is stationary relative to the motor primary 17 of the motor 12. The element 18 is affixed at its leading end to the element 13.

There is an encoder head 19 with an encoder scale 30 located between the head 19 and the movable element 11 and 13, respectively. Each of the elements 11 and 13 are supported on three spaced air bearings 200, 201 and 202. These bearings are mounted with the elements 11 and 13 through arms 203, 204, and 205 respectively. There is also a lateral located magnetically preloaded air bearing 206 mounted in plate 207 which prevents the arms 11 and 13 from moving laterally sideways relative to the desired axially motion. The action of the magnetic preloaded air bearings are described further below.

In the head portion 20 of the element 13 there is a magnet 21 which acts as a preload to attract the shuttle 16 towards the interface 22 between the leading end of element 13 and the face 23 of the shuttle 16. There is also a pair of air bearing outlets 24 and 25 which act to repel the shuttle 16 from the face of the element 13. In this manner, the balancing between the magnetic attraction and the air repulsion acts to create an air bearing between the shuttle 16 and the leading end of the element 13. Suitable means is provided in or with the motor for generating the air pressure.

By having a pair of air bearings in the leading end of each of the elements 11 and 13, a balance is provided to the shuttle 16 so that angular movement as indicated by angle theta is limited. A fine tuning of the air pressure out of each of the inlets 24 and 25 would ensure that angular movement theta of the shuttle 16 is minimized and effectively prevented. The fine tuning is by having the outlet force from each respective outlet substantially equal. Any tendency to twist in an angular sense would be counteracted by changing the air pressure from the various air outlets of the elements 11 and 13.

A similar air bearing is developed on the interface between face 26 of the shuttle and face 27 of the element 11. Each of the elements 11 and 12 are themselves suspended on air bearings. This is effected by a similar balance between magnetic forces and air pressure forces between the element 18 and the armature 19. In this manner, the elements 11 and 13 can move under air bearing action longitudinally along the respective X and Y axis along which they are aligned.

Figure 9A:
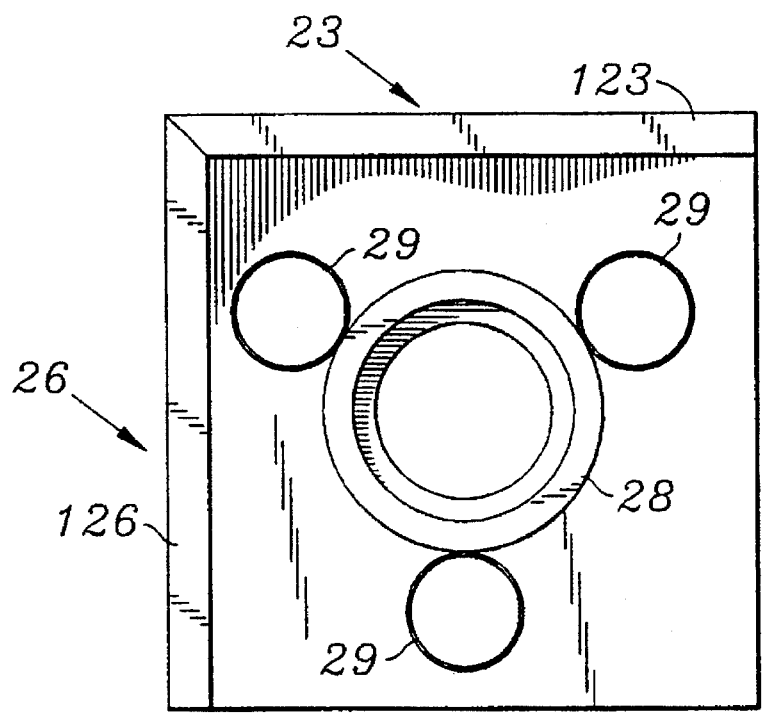
FIGS. 9a and 9b illustrate, respectively, the under plan view and a side view of a shuttle which shows the preload means and the air bearing pads.
Figure 9B:
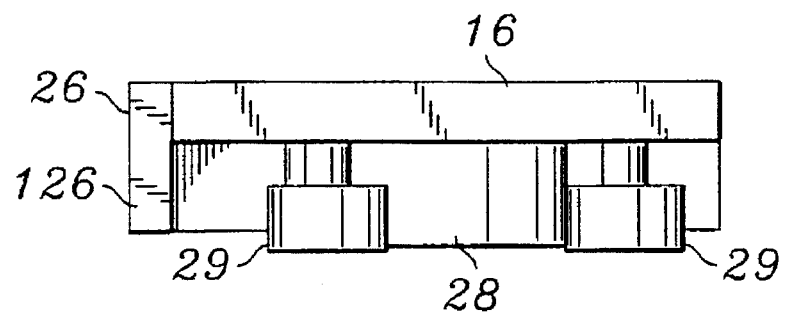

The shuttle 16 as illustrated in FIGS. 9a and 9b similarly has a magnet 28 which is diagrammatically illustrated at the center of the shuttle 16. This magnet 28 acts to cause a preload by magnetic attraction between the shuttle 16 and the surface 15. Similarly, the shuttle 16 has three air outlet pads 29 arranged strategically in a triangular relationship about the shuttle so that air can be forced downwardly towards the surface 15. This acts to lift the shuttle 16 from the surface 15. The balance between the magnetic attraction and the air repulsion acts to suspend the shuttle 16 on an air bearing on the surface 15. Suitable pressure generating means are provided for creating the air repulsion for the shuttle 16. Two adjacent sides 23 and 26 of the shuttle 16 provide steel elements 123 and 126, respectively, which permit for the magnetic interaction with the arms 11 and 13. The main body of the shuttle 16 is formed of a non-magnetic material, such as aluminum.

Figure 7:
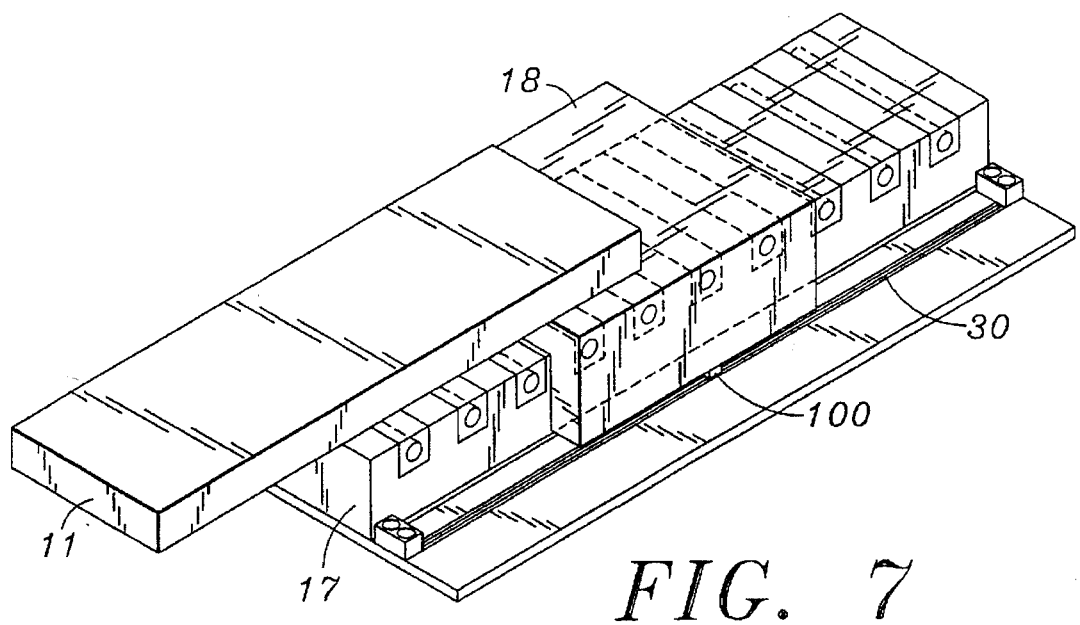
FIG. 7 is a perspective cross-sectional view of a linear DC motor.

Each of the linear motors are either DC motors or induction motors. As illustrated in another embodiment of a linear motor in FIG. 7, a feedback scale 30, which is a linear scale, is provided on the side of each of the motors. Thus, as a U-shaped element 18 moves forwardly and backwardly in a linear direction the precise location of the element 18 relative to the elongated armature 17 can be established.

The encoder feedback scale 30 can be defined by minute and discrete magnetic zones such that the interaction of the element 18 relative to these magnetic zones can be precisely regulated. A magnetic read head 100 is provided with the element 18 so that it interacts with the magnetic scale 30 of the encoder feedback means. The motion and position of the element 18 can thereby be definitively controlled.

In other forms of the invention, the read head 100 can be a laser means operable with interference elements running along the linear scale 30 of each of the motors.

Figure 5:
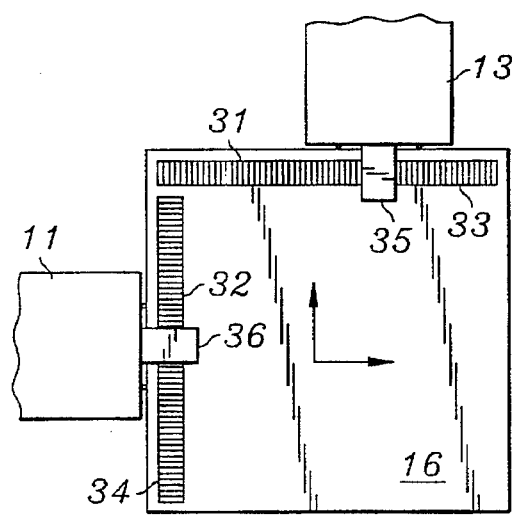
FIG. 5 is a diagrammatic view of an alternative arrangement of two linear motors in relationship to a shuttle using a different feedback means.

In a different embodiment of the invention as illustrated in FIG. 5, there are provided interference scales 31 and 32 on the shuttle 16. The scales 31 and 32 as illustrated show the fine gradations 33 and 34, respectively, which operate with the read heads 35 and 36 which are forwardly located relative to each of the respective elements 13 and 11. The nature of this arrangement is that as shuttle 16 is moved in an X direction, the scale 33 is operable. Thus, the element 11 operates with scale 33 through read head 35. As the shuttle moves in a Y direction, the read head 36 operates with scale 32. The motor with element 13 works with the read head 36 and element 32 which related to is both on the element 11 of the opposite motor.

The invention provides for very fine control of the shuttle 16 over the surface 15. The control is essentially equally as fine in control as the motion of each of the elements 11 and 13 for the respective motors in their linear operation.

Figure 6:
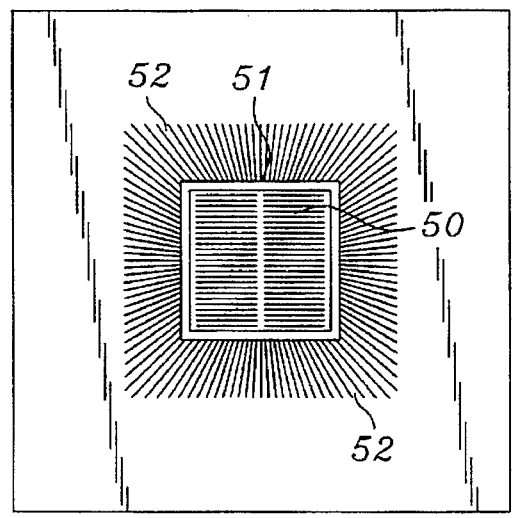
FIG. 6 is a plan representation of a chip with multiple wires to be bonded and is typical of a workpiece to be moved in an XY sense with precision.

As indicated in FIG. 6, there is a chip 50 which has multiple terminals 51 which need to be bonded with wires 52. When a chip 50 is mounted on top of the table, platen or shuttle 16, this location can be precisely determined such that wire bonding can be placed accurately relative to the terminals 52 and the positions about the chip 50. As chips 50 increase in density and more and more terminals need to be provided for precise bonding, it is increasingly important that the location of the chip 50 be precisely determined relative to a tool for affecting bonding or soldering as the case may be.

Figure 8:
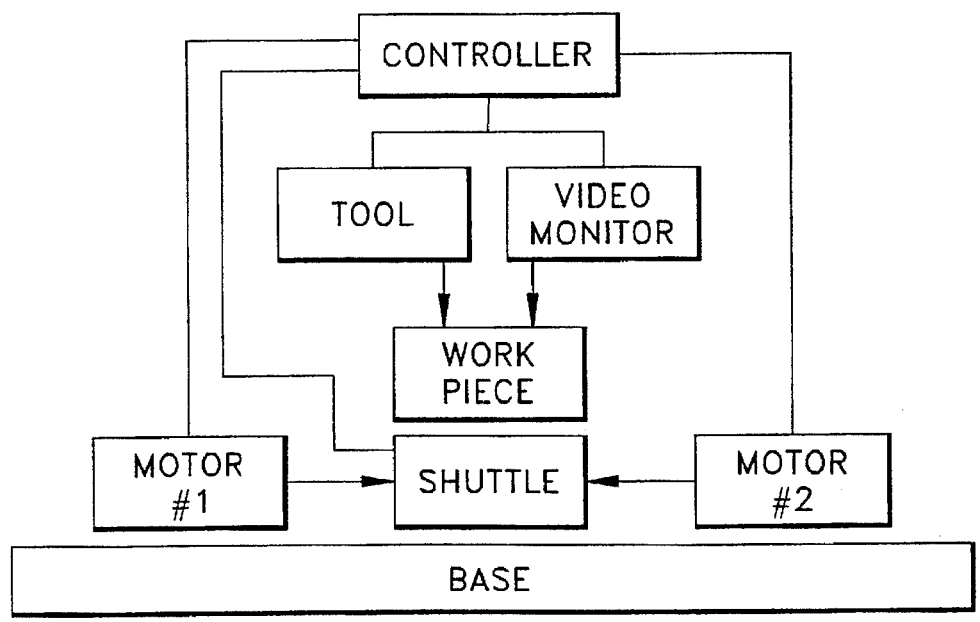
FIG. 8 is a working diagram of a system incorporating the motor system and using a workpiece with a tool.

In FIG. 8 there is illustrated a system for controlling the two motors, the shuttle, and the tool relative to a workpiece on the shuttle. A video monitor is also illustrated for visually being able to pictorially monitor the relationship of the workpiece and the tool. The controller can operate the different motors to effect the appropriate linear movement in the X and Y directions, respectively. Also, the controllers can regulate the operation of the air generating means for the shuttle and the motor to ensure the effective operation of the air bearings. The controller is computer operated to regulate the different operations of the elements of the apparatus.

The invention is directed to a system for providing the precise XY control of a shuttle so that different workpieces 50 can be located relative to tools and the like without angular movement. The invention is also directed to systems, apparatus and methods incorporating the motor system.

In one example of the invention the shuttle extends about 5 inches square in size. The breadth of each of the elements 11 and 13 inter-engaging with the shuttle interface is about 2 inches. The amount of travel in each of the X and Y axes of the motors is three inches.

Many variations of the invention exist each differing from others in matters of detail only. Thus, the table, platen or shuttle 16 could be used to perform different functions for different operations of the motor system of the invention. Suitable mounting apparatus can be used with the system so that the location of the shuttle 16 can be monitored visually. The motor system can be incorporated into apparatus for working with different work pieces, which can require electronic, mechanical or other physical manipulation, work, observation or the like. Although the invention has been described with reference to linear motors, it is clear that other motors can be used. For instance, there may be other forms of electric motors, pneumatic or hydraulic motor systems. Also, although the preload has been described in the sense of a magnetic attraction, there can be a preload by a pneumatic vacuum force or other attraction force.

Although the relationship of the shuttle on the base has been described as being on an air bearing there could also be a suitable mechanical roller or ball bearing interaction between the shuttle and the base. Further, the shuttle can take different forms, for instance it may be a stage having a cross section and shape different to rectangular.

What is claimed is:

1. A motor system for generating compound orthogonal motion comprising:
   a first motor directed for effecting movement of a first element in a first of two orthogonal directions,
   a second motor directed for effecting movement of a second element in the second of the orthogonal directions,
   a base for locating the first motor and second motor relative to each other so that the elements are movable in a single plane in their respective orthogonal directions relative to each other and over the base, and a shuttle reactive with the two elements such that movement of the elements effects compound orthogonal movement of the shuttle, the shuttle having an air bearing relative to the base, and including an air bearing between the shuttle and respectively each of the elements.

2. A system as claimed in claim 1 wherein the shuttle has an air bearing relative to the base.

3. A system as claimed in claim 1 wherein at least one of the elements and the shuttle respectively have air bearings relative to the base.

4. A system as claimed in claim 1 including an air bearing between the shuttle and at least one element.

5. A system as claimed in claim 2 including an air bearing between the shuttle and respectively each of the elements.

6. A system as claimed in claim 1 wherein the first motor is a closed loop single axis motor, such closed loop motor including single axis feedback means for enhancing control of the movement of the element.

7. A system as claimed in claim 1 wherein both the first motor and the second motor are single axis closed loop motors, such closed loops including respective single axis feedback means for respectively enhancing control of the movement of the respective elements.

8. A system as claimed in claim 6 wherein the first motor is a linear motor, and the feedback means is effected by magnetic interaction between the element and a linear scale, the scale being part of the motor, and being directed substantially parallel to the movement of the element.

9. A system as claimed in claim 7 wherein the motors are linear motors, and the feedback means for each respective motor is effected by a magnetic interaction between a linear scale for each respective motor, the scale being substantially parallel to the movement for each respective element of each respective motor.

10. A system as claimed in claim 6 wherein the first motor is a linear motor, and the feedback means is effected by optical interaction between the element and a linear scale being part of the motor, the scale being substantially directed to be parallel to the movement of the element.

11. A system as claimed in claim 7 wherein the motors are linear motors, and the respective feedback means is effected by optical interaction between the respective elements of respective motors, and including respective linear encoders for each motor, the encoders being part of each respective motor and the encoders including linear scales being directed substantially parallel to the direction of movement of each respective element.

12. A system as claimed in claim 6 wherein the feedback means includes a linear scale mounted with the shuttle.

13. A system as claimed in claim 7 wherein the feedback means includes at least two linear scales mounted with the shuttle, a first scale being for interaction with the element of the second motor, and a second scale being for interaction with the element of the first motor.

14. A system as claimed in claim 13 wherein the first scale is directed substantially parallel to the direction of movement of the second element, and the second scale is directed such that is parallel to the direction of movement of the first element.

15. A system as claimed in claim 12 wherein the scale and element interact magnetically, the scale having discrete magnetic elements, and the element including a read head operative with the discrete magnetic elements.

16. A system as claimed in claim 13 wherein each magnetic scale includes discrete magnetic elements, and each respective element of the motor includes a read head, the respective read heads being reactive with a cooperating scale.

17. A system as claimed in claim 12 wherein the feedback means includes optical read head means, the optical read heads interacting with an interference element located on the shuttle.

18. A system as claimed in claim 13 including two optical scales on the shuttle, the optical scales being directed for respective interaction with read heads associated with respective elements of each of the motors.

19. A system as claimed in claim 13 wherein the respective scales on the shuttle are directed substantially orthogonally relative to each other, and wherein respective motors includes read heads, the first motor including a read head for interacting with the scale on the shuttle directed substantially parallel to movement of the first element, and the read head on the second motor being directed to interact with the scale on the shuttle directed substantially parallel to the element movement of the second motor.

20. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, and a shuttle reactive with the two elements such that movement of the elements effects compound orthogonal movement of the shuttle, both the first motor and the second motor being single axis closed loop motors, such closed loops including respective single axis feedback means for respectively enhancing control of the movement of the respective elements, the feedback means including at least two linear scales mounted with the shuttle, a first scale being for interaction with the element of the second motor, and a second scale being for interaction with the element of the first motor, and wherein the respective scales on the shuttle are directed substantially orthogonally relative to each other, and wherein respective motors include read heads, the first motor including an scale means for interacting with the encoder on the shuttle directed substantially parallel to movement of the first element, and the read head on the second motor being directed to interact with the scale on the shuttle directed substantially parallel to the element movement of the second motor and wherein the read head of the first motor acts to regulate movement of the second element of the second motor and the read head of the second motor acts to regulate movement of the first element of the first motor.

21. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, at least one of the elements or the shuttle having an air bearing relative to the base, means for forming the air bearing by exerting an air pressure between an interacting face and the base, and preload means for attracting the interacting face and the base, the air pressure balancing the effect of the preload attraction.

22. A system as claimed in claim 21 wherein at least one of the elements, and also the shuttle respectively have air bearings relative to the base, and including means for forming the air bearing by exerting an air pressure between respective interacting faces and the base, and including magnetic means for attracting the respective interacting faces and the base, the air pressure balancing the effect of the magnetic attraction.

23. A system as claimed in claim 21 wherein both of the elements and the shuttle respectively have air bearings relative to the base including means for forming the air bearing by exerting an air pressure between respective interacting faces and the base, and including magnetic means for attracting the respective interacting faces and the base, the air pressure balancing the effect of the magnetic attraction.

24. A system as claimed in claim 21 including an air bearing between the shuttle and at least one element including means for forming the air bearing by exerting an air pressure between an interacting face of the shuttle and an interacting face of the element, and including magnetic means for attracting the interacting faces, the air pressure balancing the effect of the magnetic attraction.

25. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, at least one of the elements or the shuttle having an air bearing relative to the base, means for forming the air bearing by exerting an air pressure between an interacting face and the base, and preload means for attracting the interacting face and the base, the air pressure balancing the effect of the preload attraction, and an air bearing between the shuttle and respectively each of the elements, including means for forming the air bearing by exerting an air pressure between an interacting face of the shuttle and an interacting face of the element, and including magnetic means for attracting the interacting faces, the air pressure balancing the effect of the magnetic attraction.

26. A system as claimed in claim 9 wherein the air bearing is formed by means for exerting an air pressure between interacting faces, and including magnetic means for attracting the interacting faces, the air pressure balancing the effect of the magnetic attraction.

27. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, and at least two air bearings between each face of each element and the shuttle such that angular movement of the shuttle relative to the elements is restrained.

28. A system as claimed in claim 27 wherein at least one of the elements, and additionally the shuttle have air bearings relative to the base, and including at least two air bearings between each face of each element and the shuttle such that angular movement of the shuttle relative to the elements is restrained.

29. A system as claimed in claim 27 wherein both of the elements and the shuttle respectively have air bearings relative to the base, and including at least two air bearings between each face of each element and the shuttle such that angular movement of the shuttle relative to the elements is restrained.

30. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, and a shuttle reactive With the two elements such that movement of the elements effects compound orthogonal movement of the shuttle, and at least one of the motors being a DC linear motor.

31. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, and a shuttle reactive with the two elements such that movement of the elements effects compound orthogonal movement of the shuttle, and wherein both the first motor and the second motor are single axis closed loop motors, such closed loops including respective single axis feedback means for respectively enhancing control of the movement of the respective elements, and at least one of the motors being a DC linear motor.

32. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, at least one of the elements or the shuttle having an air bearing relative to the base, means for forming the air bearing by exerting an air pressure between an interacting face and the base, and preload means for attracting the interacting face and the base, the air pressure balancing the effect of the preload attraction, and at least one of the motors being a DC linear motor.

33. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, and a shuttle reactive with the two elements such that movement of the elements effects compound orthogonal movement of the shuttle, the motors being linear motors, wherein both the first motor and the second motor are single axis closed loop motors, such closed loops including respective single axis feedback means for respectively enhancing control of the movement of the respective elements, feedback means for each respective motor being effected by a magnetic interaction between a linear scale for each respective motor, the scale being substantially parallel to the movement for each respective element of each respective motor, an air bearing being formed by means for exerting an air pressure between interacting faces, and there being magnetic means for attracting the interacting faces, the air pressure balancing the effect of the magnetic attraction, and at least one of the motors being a DC linear motor.

34. A motor system for generating XY motion comprising:

a first linear motor directed for effecting movement of a first element in a first of two orthogonal directions, a second linear motor directed for effecting movement of a second element in the second of the orthogonal directions, a base for locating the first motor and second motor relative to each other in a single plane so that the elements are movable in their respective orthogonal directions relative to each other in a single plane and over the base, and a shuttle in substantially the same plane reactive with the two elements such that movement of the elements effects XY movement of the shuttle in the plane.

35. A motor system for generating XY motion comprising:

a first linear motor directed for effecting movement of a first element in a first of two orthogonal directions, a second linear motor directed for effecting movement of a second element in the second of the orthogonal directions, a base for locating the first motor and second motor relative to each other in a single plane so that the elements are movable in their respective orthogonal directions relative to each other in a single plane and over the base, and a shuttle reactive with the two elements such that movement of the elements effects XY movement of the shuttle including an air bearing between the shuttle and each of the elements.

36. A motor system for generating XY motion comprising:

a first linear motor directed for effecting movement of a first element in a first of two orthogonal directions, a second linear motor directed for effecting movement of a second element in the second of the orthogonal directions, a base for locating the first motor and second motor relative to each other in a single plane so that the elements are movable in their respective orthogonal directions relative to each other in a single plane and over the base, and a shuttle reactive with the two elements such that movement of the elements effects XY movement of the shuttle wherein both the first motor and the second motor are closed loop motors, such closed loops including respective linear encoder means for respectively enhancing control of the movements of the respective elements.

37. A system as claimed in claim 36 including feedback means for each respective motor effected selectively by at least one of magnetic or optical interaction between an encoder for each respective motor, the encoders including respectively a scale, the scale being substantially parallel to the movement for each respective element of each respective motor.

38. A system as claimed in claim 37 wherein the feedback means includes scales mounted selectively with at least one of the motors or with the shuttle.

39. A motor system for generating XY motion comprising:

a first linear motor directed for effecting movement of a first element in a first of two orthogonal directions, a second linear motor directed for effecting movement of a second element in the second of the orthogonal directions, a base for locating the first motor and second motor relative to each other in a single plane so that the elements are movable in their respective orthogonal directions relative to each other in a single plane and over the base, and a shuttle reactive with two elements such that movement of the elements effects XY movement of the shuttle including air bearings between each face of each element and the shuttle for restraining angular movement of the shuttle relative to the elements.

40. A system as claimed in claim 37 including air bearings between each face of each element and the shuttle for restraining the angular movement of the shuttle relative to the elements.

41. A system as claimed in claim 39 including means for forming the air bearing by exerting an air pressure between an interacting face of the respective elements and the base, and including preload means for attracting the interacting face and the base, the air pressure balancing the effect of the preload attraction.

42. A system as claimed in claim 39 including at least two air bearings between each face of each element and the shuttle for controlling the angular movement of the shuttle relative to the elements.

43. A motor system for generating XY motion comprising:

a first linear motor directed for effecting movement of a first element in a first of two orthogonal directions, a second linear motor directed for effecting movement of a second element in the second of the orthogonal directions, a base for locating the first motor and second motor relative to each other in a single plane so that the elements are movable in their respective orthogonal directions relative to each other in a single plane and over the base, a shuttle reactive with the two elements such that movement of the elements effects XY movement of the shuttle, at least the shuttle having an air bearing relative to the base, means for forming the air bearing by exerting an air pressure between an interacting face of the shuttle and the base, and magnetic means for attracting the interacting face and the base, the air pressure balancing the effect of the magnetic attraction.

44. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in substantially the same single plane in their respective orthogonal directions relative to each other and over the base, and a shuttle reactive in substantially the same single plane with the two elements in the plane such that movement of the elements effects compound orthogonal movement of the shuttle.

45. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in substantially the same single plane in their respective orthogonal directions relative to each other and over the base, a shuttle reactive in the same single plane with the two elements such that movement of the elements in the plane to effect compound orthogonal movement of the shuttle, at least one of the elements or the shuttle having an air bearing relative to the base, means for forming the air bearing by exerting an air pressure between an interacting face and the base, and preload means for attracting the interacting face and the base, the air pressure balancing the effect of the preload attraction.

46. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, and a non-mechanically coupled bearing between the shuttle and respectively each of the elements.

47. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, and non-mechanically coupled bearings between the shuttle and respectively each of the elements and between the shuttle and the base.

48. A motor system for generating compound orthogonal motion comprising:

a first DC linear motor directed for effecting movement of a first element in a first of two orthogonal directions, a second DC linear motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, the elements and the shuttle being in a bearing relationship, and preload means for attracting the interacting element and the shuttle.

49. A motor system for generating compound orthogonal motion comprising:

a first motor directed for effecting movement of a first element in a first of two orthogonal directions, a second motor directed for effecting movement of a second element in the second of the orthogonal directions, a planar base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, and a non-mechanically coupled bearing between each element and the shuttle such that angular movement of the shuttle relative to the elements is controllable.

50. A system for generating XY motion comprising:

a first motive means directed for effecting movement of a first element in a first of two orthogonal directions, a second motive means directed for effecting movement of a second element in the second of the orthogonal directions, a base for locating the first motive means and the second motive means relative to each other in a plane so that the elements are movable in their respective orthogonal directions relative to each other over the base, and a shuttle non-mechanically linked with and reactive with the two elements such that movement of the elements effects XY movement of the shuttle.

51. A system as claimed in claim 49 wherein the bearing includes means for forming an attracting force and a repelling force between each element and the shuttle.

52. A system as claimed in claim 50 including a non-mechanical bearing between the shuttle and the base, and including means for forming an attracting force and a repelling force between each element and the shuttle and between the shuttle and the base.

53. A motor system for generating XY motion comprising:

a motor directed for effecting movement of a first element in a first of two orthogonal directions;

a motor directed for effecting movement of a second element in the second of the orthogonal directions;

a base for locating the first motor and second motor relative to each other in a single plane so that the elements are movable in their respective orthogonal directions relative to each other in a single plane and over the base;

a shuttle reactive with the two elements such that movement of the elements effects XY movement of the shuttle; and a plurality of bearings between each face of each element and the shuttle for restraining angular movement of the shuttle relative to the elements.

* * * * *

UNITED STATES PATENT AND TRADEMARK OFFICE
CERTIFICATE OF CORRECTION

PATENT NO. : 5,648,690

DATED : July 15, 1997

INVENTOR(S) : Walter E. Hinds

It is certified that error appears in the above-identified patent and that said Letters Patent is hereby corrected as shown below:

In column 10, line 61, "dosed" should read --closed--.

Signed and Sealed this

Seventh Day of April, 1998

Attest:

BRUCE LEHMAN

*Attesting Officer*  *Commissioner of Patents and Trademarks*